United States Patent [19]

Gilman

[11] 4,186,245

[45] Jan. 29, 1980

[54] ENERGY STORAGE FLYWHEEL

[75] Inventor: John J. Gilman, Convent Station, N.J.

[73] Assignee: Allied Chemical Corporation, Morris Township, N.J.

[21] Appl. No.: 946,481

[22] Filed: Sep. 28, 1978

[51] Int. Cl.$^2$ .................... B32B 15/02; G05G 1/00
[52] U.S. Cl. .................... 428/635; 74/572; 428/607
[58] Field of Search ............ 428/635, 636, 608, 607, 428/599, 902; 74/572

[56] References Cited

U.S. PATENT DOCUMENTS

| | | | |
|---|---|---|---|
| 3,764,277 | 10/1973 | Hollis | 428/636 |
| 3,788,162 | 1/1974 | Rabenhorst et al. | 74/572 |
| 3,856,074 | 12/1974 | Kavesh | 164/87 |
| 3,856,513 | 12/1974 | Chen et al. | 75/122 |
| 3,989,517 | 11/1976 | Tanner et al. | 75/175.5 |
| 4,000,665 | 1/1977 | Rabenhorst | 74/572 |
| 4,028,962 | 6/1977 | Nelson | 74/572 |
| 4,036,638 | 7/1977 | Ray et al. | 75/123 B |
| 4,050,931 | 9/1977 | Tanner et al. | 75/175.5 |

OTHER PUBLICATIONS

Gilman, "Metallic Glasses–A New Technology", 1976, *Crystal Growth and Materials,* North–Holland Publishing Company, 1977.

*Primary Examiner*—L. Dewayne Rutledge
*Assistant Examiner*—Peter K. Skiff
*Attorney, Agent, or Firm*—Frank A. Peacock; Gerhard H. Fuchs

[57] ABSTRACT

A flywheel is provided for storing rotational energy at high energy densities and which possesses a primary failure mode of delamination. The flywheel is constructed from glassy metal alloy strips having a high specific strength comparable to anisotropic fibers used in high energy density flywheels and, in addition, having isotropic or nondirectional strength properties allowing a fuller utilization of the strength of the material and thereby increasing energy storage capacities. The glassy metal alloy strips are formed into circular layers, and a plurality of layers are joined concentrically to build up the flywheel. Joining between strips and layers is accomplished with bonding means such that a substantially mechanically monolithic composite structure results, by providing a bonding shear strength at least about equal to the specific strength times the density divided by the aspect ratio of the glassy metal alloy strips.

13 Claims, 6 Drawing Figures

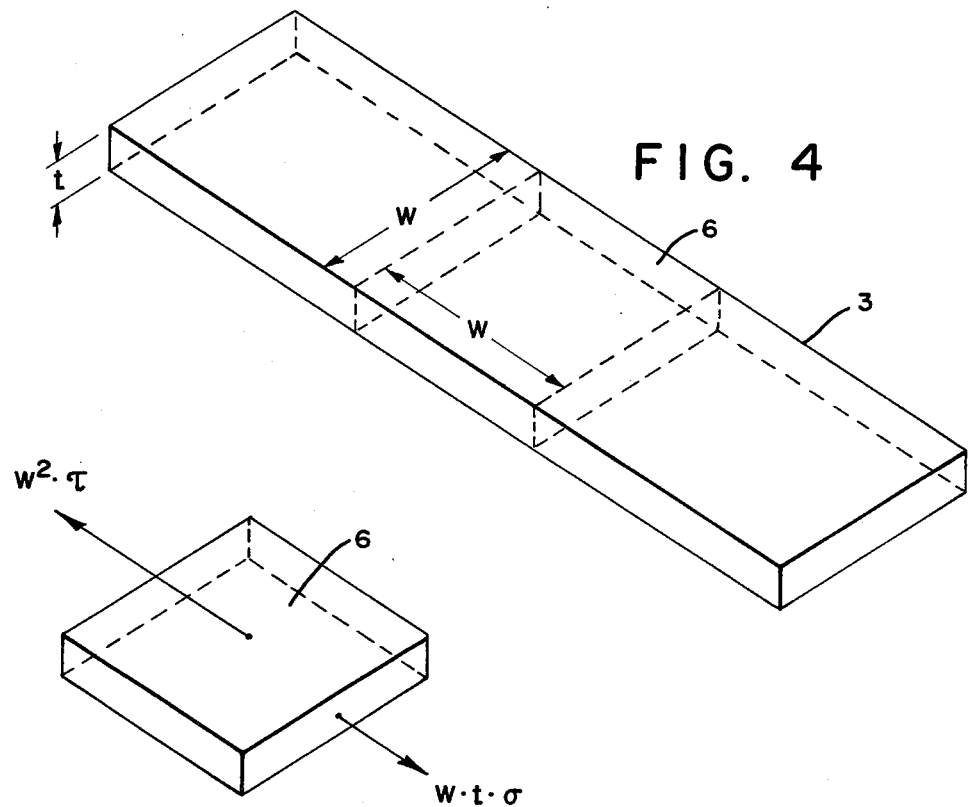
FIG. 4
FIG. 5
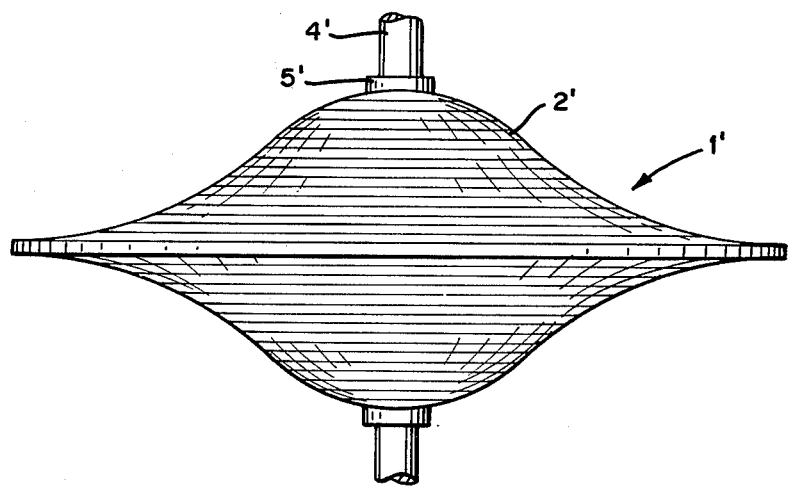
FIG. 6

ENERGY STORAGE FLYWHEEL

BACKGROUND OF THE INVENTION

This invention relates generally to high performance energy storage flywheels. Specifically, this invention relates to composite flywheels constructed from glassy metal alloy strips and selected bonding means.

Energy storage flywheels are rotatively interposed between a mechanical energy source and a mechanical load as a rotational energy storage device to reduce the peak capacity requirement of the energy source. When the load demand is less than the output of the energy source, the flywheel is charged with rotational energy, and conversely when load exceeds supply output, the flywheel is discharged of rotational energy.

The amount of stored rotational energy or flywheel capacity increases with the square of angular velocity according to physical principles of kinetics; however, as a practical matter, the maximum angular velocity is limited by strength of materials considerations in order to preserve the structural integrity of the flywheel rotor. Further, efficiency considerations are important in evaluating a particular rotor. Efficiency of energy storage flywheels is expressed in terms of energy density (rotational energy/rotor mass) and volumetric efficiency (rotational energy/rotor volume). As efficiency increases, rotor space and mass requirements decrease for a given quantity of stored energy. Both the maximum allowable angular velocity and efficiency are directly related to the specific strength (tensile strength/density) of the primary load bearing material of the rotor. Therefore, increasing the specific strength of the primary load bearing material tends to increase both the energy storage capacity and efficiency of the flywheel.

Flywheel rotors may be broadly classified with respect to materials of construction as isotropic or anisotropic. Isotropic rotors are constructed of a primary load bearing material having isotropic strength properties, i.e. substantially nondirectional strength properties. Anisotropic rotors are composite rotors utilizing a material, typically high strength fibers, having extremely high unidirectional specific strength in a bonding matrix for transverse support. Generally, composite rotors are made of a plurality of materials.

Isotropic rotors of conventional materials, while being relatively easy to fabricate, have two major disadvantages. Their specific strength is not large enough to provide for high energy densities, and such rotors are subject to a catastrophic failure mode, rotor burst, whereby large, high energy fragments are cast off from the rotor during disintegration.

Anisotropic rotors are superior to isotropic rotors as a result of the utilization of fibers having high unidirectional specific strength, thereby allowing increased energy densities. Typically, these rotors are built up of layers composed of these high strength fibers in a bonding matrix. By selectively varying orientation of these layers, and therefore of the fibers within the overall structure, a pseudoisotropic rotor is produced having a bulk specific strength less than that of the fibers but greater than that of conventional isotropic materials. Additionally, upon failure, these composite rotors disintegrate by the relatively benign failure mode of delamination, i.e. the rotor disintegrates by small bits since the matrix structure retards crack propagation. As a result, housing requirements are substantially reduced as compared to those for isotropic rotors.

Examples of anisotropic flywheels and appropriate fibers are shown in U.S. Pat. Nos. 3,788,162 "Pseudoisotropic Filament Disk Structures" issued Jan. 29, 1974, to D. W. Rabenhorst el al. and 4,000,665 "Woven Filament Rotor Structure" issued Jan. 4, 1977, also to D. W. Rabenhorst. The first cited patent shows a rotor composed of layers of high strength fibers arranged in parallel, planar fashion. Each layer is rotated within the structure with respect to adjacent layers so that a pseudoisotropic disk results. In the second cited patent, each layer of the disk is constructed by interweaving high strength fibers.

However, there are limitations inherent with these anisotropic composite rotors. Full advantage is not taken of the high unidirectional strength of the composite fibers, due to multidirectional loading within a rotating flywheel. Additionally, the maximum packing factor obtainable for cylinders (fibers) is about 78%. Decreasing the packing factor increases volume and therefore decreases volumetric efficiency.

SUMMARY OF THE INVENTION

The present invention overcomes these limitations by utilizing glassy metal alloy strips in combination with certain bonding means to construct layers from which a composite rotor is built up. Glassy metal alloys have high specific strength, comparable to high strength fibers, but in addition have isotropic or nondirectional strength characteristics, thereby providing the potential of rotors having a bulk strength approaching that of the glassy metal alloy as the primary load bearing material of the rotor.

Additionally, glassy metal alloys may readily be produced in strip form. In building up a composite rotor from strips, as compared to fibers, nearly a 100% packing fraction can be obtained which tends to increase volumetric efficiency of the rotor. Also, strips, as opposed to fibers, provide greater relative adhesion due to the greatly increased surface area available for bonding to adjacent strips, allowing a wider range of selection for bonding materials in designing for a mechanically monolithic rotor. Despite the isotropic nature of the rotor, the primary failure mode is that of delamination and not rotor burst.

The present invention provides a flywheel for energy storage having the capacity for storing rotational energy at high energy densities and at high volumetric efficiencies and having a delamination primary failure mode. The flywheel comprises a plurality of circular layers joined concentrically, each layer being composed of a plurality of glassy metal alloy strips joined in planar fashion, the strips having substantially equal thickness and aspect ratio (width/thickness), the aspect ratio being at least about 5. Bonding means provide a joining shear strength between the component layers and between the strips within each layer at least about equal to the tensile strength of the strip material divided by the aspect ratio.

The glassy metal alloy strips within each layer may be arranged sequentially in planar parallel fashion and joined edgewise longitudinally or, alternatively, interlaced and joined in a woven pattern. The component layers may be mutually disposed such that the angles formed by the planar axes of adjacent layers are substantially equal throughout the flywheel structure. Additionally, the radii of the layers may be selectively varied in symmetrical fashion about the central layers in a substantially hyperbolic constant stress producing fashion.

The particular glassy metal alloy material may be selected as one having a specific strength comparable to that of high strength anisotropic fibers. Bonding can be accomplished by adhesive bonding and also by soldering or brazing if carried out at a temperature less than the glass transition temperature of the particular glassy metal alloy.

BRIEF DESCRIPTION OF THE DRAWINGS

Further details are given below with reference to the examples shown in the drawings in which:

FIGS. 4 and 5 show a schematic illustration of a small volume of strip material within a layer of the flywheel, illustrating the relationship between tensile stress induced by centrifugal forces and bonding shear stress at the strip faces in reaction to the tensile forces.

FIG. 6 is an elevation view of a layered flywheel having an "optimized" shape.

DETAILED DESCRIPTION OF THE PREFERRED EMBODIMENTS

Figure 1:
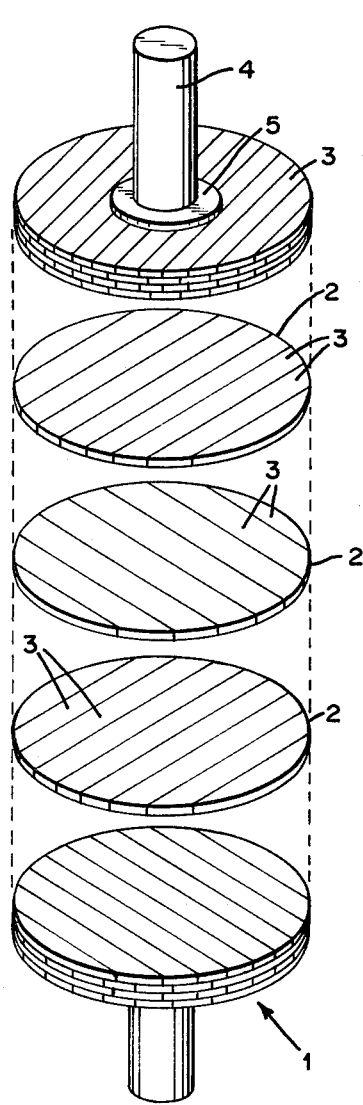
FIG. 1 is an exploded perspective view of a flywheel of the present invention, showing component layers of parallel glassy metal alloy strips and showing the angular disposition between adjacent layers.
Figure 2:
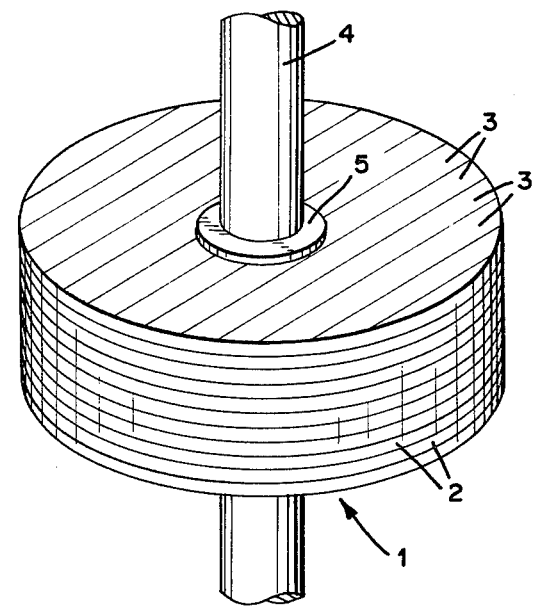
FIG. 2 is a perspective view of the flywheel constituting a collapsed view of FIG. 1.

Referring specifically to the drawings, in FIG. 1 a disk-shaped flywheel 1 is shown in exploded perspective emphasizing the layered construction and angular disposition between adjacent layers. The same flywheel is shown in FIG. 2 in ordinary perspective.

Circular layers 2 of glassy metal alloy strips 3 are built up, as discussed below, to produce a composite rotor 1 of desired thickness. Glassy metal alloy strips of indefinite length may be produced by any suitable continuous casting process, such as that described in Kavesh's patent below referenced. As extremely high quench rates are required to prevent crystallization in cooling a molten metal below its solidification temperature and eventually below its glass transition temperature, glassy metal alloys are necessarily produced in very thin shapes due to heat transfer considerations. A typical strip thickness is two mils. A typical width is 500 mils; however, considerable choice is available with respect to the width dimension. For these dimensions, the aspect ratio of the strip cross section is 250, although strips with an aspect ratio down to about 5 may be readily produced. Further discussion of the aspect ratio is given below in connection with selecting bonding means for the invention. Therefore, it may be seen that construction of rigid articles by building up a number of such strips may be somewhat tedious owing to their small thickness.

Figure 3:
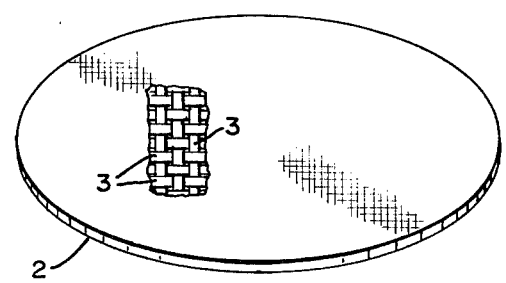
FIG. 3 is a plan view of a single layer of interlaced glassy metal alloy strips.

In the embodiment shown in FIG. 1, the strips 3 within a given layer are arranged in planar parallel fashion and joined edgewise longitudinally. As a practical matter, to facilitate construction, strips are arranged and joined directly atop the previous adjacent layer at an angular disposition, preferably about 90°, with respect to the planar axes defined by the direction of the longitudinal axes of the strips. Alternatively, self-supporting units of two or more layers may be constructed in a similar manner, and then a number of such units may be joined to produce a desired thickness rotor. In an alternative, as shown in FIG. 3, woven layers may be constructed from at least two sublayers of strips 3. To produce the circular shape of each layer, individual layers or units of a number of layers may be stamped.

In FIGS. 4 and 5, the relationship between centrifugal tensile forces acting on individual strips 3 and bonding shear strength between strips is illustrated. Element 6 is within a strip 3 and has a length equal to the width of the strip.

Consider an element 6 in such a structure that is subjected to a tensile stress and is restrained by shear forces provided by adhesion to its neighboring elements. Equating these forces and solving for the shear stress, the following expression is obtained:

$$\sigma \cdot w \cdot t = \tau \cdot w^2 \text{ or } \tau = \sigma/R \text{ or } \tau = \rho(\sigma/\rho)/R$$

where $\sigma$ = tensile stress induced by centrifugal force.
$\rho$ = density of strip material.
$\sigma/\rho$ = specific strength.
$\tau$ = shear stress between adjacent bonded strips.
$w$ = strip width.
$t$ = strip thickness.
$R = w/t$ = aspect ratio of strip.

Therefore, if the strength of the strip is $\sigma$, the adhesive strength that is needed to restrain the strip until it reaches its fracture strength is $\tau$. For example, if $t = 0.002$ inch and $w = 0.50$ inch then $w/t = 250$; and if $\sigma = 500,000$ psi, $\tau$ would need to be 2000 psi, which is quite reasonable for an adhesive. This means that disks made as above could be spun to destruction of the ribbon but not the glue. Conversely, given a particular glassy metal alloy having a certain strength and after selecting an adhesive, the minimum required aspect ratio can be determined by the above formulation. For example, if the tensile strength of the glassy metal alloy is 600,000 psi and the selected adhesive has a metal-to-metal lap shear strength of 6000 psi, then the minimum aspect ratio for the strip is 100.

Generally, any type of adhesive is suitable that provides a bonding shear strength according to the above formulation and is compatible for joining glassy metal alloy substrates. Standard preparatory surface treatment of cleaning and etching may be done to take full advantage of the bonding properties of the adhesive. Commercially available epoxy adhesives are representative of satisfactory adhesives. For example, nylon-epoxy adhesives and epoxy-polyamide adhesives provide metal-to-metal bonding shear strengths of about 2000 psi to about 6000 psi.

Bonding may also be accomplished by soldering or brazing provided the bonding shear strength of the join meets the above strength requirement and further provided the melting temperature of the solder or brazing material is less than the glass transition temperature for the particular glassy metal alloy, typically 750° to 950° F. If the glassy metal alloy were crystallized (and no longer glassy), then its extraordinary strength properties would be lost.

Typical glassy metal alloys are described in U.S. Pat. No. 3,856,513 "Novel Amorphous Metals and Amorphous Metal Articles" issued Dec. 24, 1974, to H. S. Chen and D. E. Polk. An example of a typical method for producing glassy metal alloy strips is given in U.S. Pat. No. 3,856,074 "Method of Centrifugal Production of Continuous Metal Filaments" issued Dec. 24, 1974, to S. Kavesh. A discussion of the physical properties of glassy metal alloys, including isotropic high strength mechanical characteristics, is given in "Metallic Glasses—A New Technology" by J. J. Gilman, North Holland Publishing Company, 1977.

The glassy metal alloy is preferably one having a high specific strength comparable to high strength anisotropic fibers, typically about $1 \times 10^6$ to $5 \times 10^6$ inches. Glassy metal alloys having a specific strength in the range of about $1 \times 10^6$ up to about $2.4 \times 10^6$ inches, and therefore being especially suited for the present invention, are shown in the following patents and are herein incorporated by reference. U.S. Pat. No. 4,050,931 "Amorphous Metal Alloys in the Beryllium-Titanium-Zirconium System" issued Sept. 27, 1977, and U.S. Pat. No. 3,989,517 "Titanium-Beryllium Base Amorphous Alloys" issued Nov. 2, 1976, both to L. Tanner et al. disclose substantially amorphous (glassy) alloys of a titanium-beryllium base having a high specific strength of at least about $1.3 \times 10^6$ inches and being suitable for use in composite bodies. A typical alloy consists essentially of about 50 atom percent titanium, about 40 atom percent beryllium, and about 10 atom percent zirconium or boron and has a specific strength of about $2.4 \times 10^6$ inches. U.S. Pat. No. 4,036,638 "Binary Amorphous Alloys of Iron or Cobalt and Boron" issued July 19, 1977, to R. Ray and S. Kavesh discloses iron-boron glassy metal alloys having a high specific strength of at least about $1.8 \times 10^6$ inches and consisting essentially of about 75 to 83 atom percent iron and about 25 to 17 atom percent boron, with the preferred alloy consisting essentially of about 75 atom percent iron and about 25 atom percent boron and having a specific strength of about $2.3 \times 10^6$ inches.

Other shapes of flywheels may readily be produced either by building up a disk-shaped rotor and then selectively contouring the faces of the rotor or by selectively and symmetrically varying the radius of the individual layers as they are progressively added about the central layer or layers of the rotor. For example in FIG. 6, in which the reference numerals indicate generally the same elements as in the previous figures, a constant stress hyperbolic flywheel shape is shown. The hyperbolic shape, symmetrical about the central layers of the rotor, produces a constant stress distribution throughout the rotor during operation eliminating relative high stress zones and thereby allowing increased rotational velocities. This shape is also referred to as an "optimized" shape. The mathematical relationship providing the basis for the hyperbolic shape is presented in the two patents to Rabenhorst et al., above cited and herein incorporated by reference. There are also degrees of optimization depending on the number or thickness of the central layers or how closely the hyperbolic shape is approximated depending upon practical production considerations.

In use, the flywheel is mounted on a shaft and rotatively interposed between a rotational energy source and a mechanical load driven by the source to serve as an energy storage buffer, charging or discharging depending upon mismatch between load demand and source output.

In mounting the flywheel rotor onto its shaft 4, hubs 5 may conveniently be employed to avoid placing the shaft through the center of the rotor to avoid stress concentration. The hubs may be joined to the rotor by bonding adhesively or by soldering or brazing as discussed above. Also, the hub may be bolted to the rotor preferably by a number of bolts penetrating the rotor at an optimized radius based on stress considerations. A further alternative is provided in those applications where the glassy metal alloy has magnetic properties. Magnetic hubs and a gripping powder, such as silicon carbide, may be employed to joint the hubs to the rotor.

While preferred embodiments of the invention have been illustrated and described, it will be recognized that the invention may be otherwise variously embodied and practiced within the scope of the following claims.

What is claimed is:

1. A flywheel for rotational energy storage, comprising:
   (a) a plurality of circular layers joined concentrically, each layer being composed of a plurality of glassy metal alloy strips joined in planar fashion to allow nearly a 100% packing fraction, said strips having high isotropic specific strength and substantially equal thickness and aspect ratio, said ratio being at least about 5; and
   (b) bonding means for providing a joining shear strength between said layers and between said strips within each layer at least about equal to the tensile strength of said strip material divided by said aspect ratio, to form a substantially mechanically monolithic composite structure having nearly the full isotropic strength of said strips.

2. A flywheel, as in claim 1, wherein said strips within each layer are arranged sequentially in planar parallel fashion and joined edgewise longitudinally.

3. A flywheel, as in claim 1, wherein said strips within each layer are interlaced and joined in a woven pattern.

4. A flywheel, as in claims 2 or 3, wherein said glassy metal alloy has an iron-boron compositional base and a specific strength of at least about $1.8 \times 10^6$ inches.

5. A flywheel, as in claim 4, wherein said glassy metal alloy consists essentially of about 75 atom percent iron and about 25 atom percent boron and has a specific strength of at least about $2.3 \times 10^6$ inches.

6. A flywheel, as in claims 2 or 3, wherein said glassy metal alloy has a titanium-beryllium compositional base and a specific strength of at least about $1.3 \times 10^6$ inches.

7. A flywheel, as in claim 6, wherein said glassy metal alloy consists essentially of about 50 atom percent titanium, about 40 atom percent beryllium, and about 10 atom percent boron or zirconium and has a specific strength of at least about $2.4 \times 10^6$ inches.

8. A flywheel, as in claims 2 or 3, wherein said layers and said strips within each layer are joined adhesively.

9. A flywheel, as in claims 2 or 3, wherein said layers and said strips within each layer are joined by soldering at a temperature less than the glass transition temperature of said glassy metal alloy.

10. A flywheel, as in claims 2 or 3, wherein said layers and said strips within each layer are joined by brazing at a temperature less than the glass transition temperature of said glassy metal alloy.

11. A flywheel, as in claims 2 or 3, wherein said layers are angularly disposed and joined such that the angles formed by the planar axes of adjacent layers are substantially equal.

12. A flywheel, as in claim 11, wherein said angles are equal to about 90°.

13. A flywheel, as in claims 2 or 3, wherein the radii of said circular layers are selectively varied in symmetrical fashion about the central layers in a substantially hyperbolic constant stress producing fashion.

* * * * *